United States Patent [19]

Takubo

[11] Patent Number: 5,510,128
[45] Date of Patent: Apr. 23, 1996

[54] PROCESS FOR PRODUCING EMULSIFIED FILTRATE OF HALF-HULLED RICE

[75] Inventor: Yoshiichi Takubo, Ehime, Japan

[73] Assignee: Takubo Kogyosho Co., Ltd., Imabari, Japan

[21] Appl. No.: 285,948

[22] Filed: Aug. 4, 1994

[30] Foreign Application Priority Data

Aug. 27, 1993 [JP] Japan .................................. 5-248449

[51] Int. Cl.$^6$ ...................................... A23L 1/10
[52] U.S. Cl. ................. 426/28; 426/18; 426/29; 426/44; 426/330; 426/598; 426/629
[58] Field of Search ...................... 426/7, 18, 28, 426/29, 31, 44, 49, 330, 590, 598, 615, 618, 629, 478, 481, 482, 484

[56] References Cited

U.S. PATENT DOCUMENTS

| | | | |
|---|---|---|---|
| 4,990,344 | 2/1991 | Euber | 426/28 |
| 5,292,537 | 3/1994 | Hammond | 426/44 |
| 5,376,390 | 12/1994 | Hammond | 426/44 |

FOREIGN PATENT DOCUMENTS

| | | |
|---|---|---|
| 59-120063 | 7/1984 | Japan . |
| 2-156864 | 6/1990 | Japan . |
| 3-168054 | 7/1991 | Japan . |

OTHER PUBLICATIONS

Nunokawa et al., Patent Abstracts of Japan, 58–31996, Feb. 1983, Abstract only.
Sakamoto et al, Patent Abstracts of Japan, 01–247067, Oct. 1989, Abstract only.
Yano et al., Patent Abstracts of Japan, 60–94082, May 1985, Abstract only.

*Primary Examiner*—Leslie Wong
*Attorney, Agent, or Firm*—Knobbe, Martens, Olson & Bear

[57] ABSTRACT

A process for producing an emulsified filtrate of half-hulled rice, comprising the steps of mixing malted rice, boiled half-hulled rice and hot water before or after saccharification of malted rice at 50° C.–60° C., preferably 57.5° C., and emulsifying and filtering the mixture to obtain an emulsified filtrate, whereby the half-hulled rice can be processed into a drink having a pleasant taste and texture without loss of nutrients.

4 Claims, No Drawings

PROCESS FOR PRODUCING EMULSIFIED FILTRATE OF HALF-HULLED RICE

BACKGROUND OF THE INVENTION

1. Field of the Invention

This invention relates to a process for producing an emulsified filtrate of half-hulled rice in order to obtain an emulsified drink, which is easy of digestion and absorption, by processing half-hulled rice.

2. Description of the Prior Art

Half-hulled rice contains abundant nutrients in embryo buds and other portions thereof and has been conventionally considered to be one of excellent food products from the viewpoint of nutrition. However, it involves the following problems. Namely, since the skin of half-hulled rice is so hard and rigid that the half-hulled rice cannot absorb water sufficiently, it is difficult to boil the half-hulled rice. Even in case of boiling half-hulled rice with a pressure cooker, the skin of half-hulled rice remains so hard that the half-hulled rice cannot be fully cooked. Thus, the boiled half-hulled rice lacks rich therefore soft taste, in comparison with boiled milled rice. In addition, boiled half-hulled rice has unpleasant taste, and is difficult to be crunched with teeth, possibly resulting therefor in indigestion. Therefore, it can cause gastroenteric trouble, and a caloric intake becomes insufficient. In order to solve these problems, "a process for producing processed half-hulled rice" has been disclosed in Japanese Patent Publication No. 2-38188. According to this process, the skin of half-hulled rice is cracked to give water absorbability to half-hulled rice, whereby half-hulled rice is allowed to be easily boiled. However, this process has not yet been sufficient to solve these problems, so that these problems remain unsolved.

SUMMARY OF THE INVENTION

It is an object of the present invention to provide a food product produced by the steps of processing boiled half-hulled rice into an emulsified drink, and then processing the drink to obtain an easily drinkable state to easily ingest the drink into the system, whereby resultant food product makes the digestion and absorption easy to enable a sufficient intake of nutriment contained in half-hulled rice.

According to the present invention, in order to process half-hulled rice into an emulsified drink, half-hulled rice is first soaked in water and boiled to prepare boiled half-hulled rice. Subsequently, hot water is added to the boiled half-hulled rice and mixed together to prepare an emulsion. In addition, the emulsion is sweetened by making use of saccharification of malted rice in order to make the emulsion easily drinkable. Specifically, after saccharified malted rice and boiled half-hulled rice are mixed together with hot water, the mixed solution is filtered to provide filtrate which is free from the skin of the half-hulled rice and any other solid residue, and the filtrate is consumed as a drink. A variety of specific processing techniques and processes are appropriately adapted for the process of the present invention, and one of examples will be shown in the following.

160 g of half-hulled rice was boiled for 70 minutes according to a half-hulled rice cooking menu of a rice cooker to prepare 400 g of boiled half-hulled rice, which was mixed in a vessel with 460 g of boiled water cooled to 55° C. after once boiled, and the temperature of the mixture was held at 55° C. as a whole. Subsequently, the mixture and 60 g of malted rice were mixed together and kept warm for approximately 7 hours in a water bath controlled at a constant temperature of 57.5° C. to saccharify the malted rice. Thereafter, the mixture and 460 g of boiling water were mixed together, boiled for 5 minutes for sterilization, agitated for 4 minutes and filtered through a wire mesh screen to provide emulsified filtrate.

Boiled water cooled down to 55° C. is added to the boiled half-hulled rice to hold the temperature of the mixture at 55° C. as a whole, and the mixture and malted rice are mixed together and kept warm at 57.5° C. for approximately 7 hours. Therefore, the temperature for keeping the mixture warm results in a temperature suitable for saccharification of malted rice to promote the saccharification. The mixture of the boiled half-hulled rice, rice bran and hot water is then boiled for 5 minutes for sterilization. Thus, yeast and other various germs are killed and no further various fermentation progressed. As a result, the mixed solution can maintain sweetness and freshness. When the mixed solution is filtered through a wire mesh screen, the solid residue can be removed to provide the emulsified filtrate which can be consumed as a drink.

According to the present invention, boiled half-hulled rice and hot water are mixed together to provide an emulsified drink, while the rice bran is added to a drink, which is thus sweetened due to saccharification of the rice bran to thereby provide an agreeable drink. Further, since the drink is emulsified, the drink is easy to digest and lightens gastroenteric burden when the drink is once ingested into the system. Furthermore, the drink makes absorption of nutrition speedy and satisfactory.

The nutriment contained in the half-hulled rice can be preserved without any damage, and approximately 40 nutritious components can be absorbed efficiently as is, and can also be absorbed with an absorption rate of not less than 90%.

In particular, various kinds of vitamins are abundant in the half-hulled rice. Thus, since niacin, inositol, β-cysterol, γ-oryzanol, phytic acid, octacosanol or the like, as well as such vitamins as B1, B2, D, E, F can be preserved without any damage during the production process, the emulsified filtrate of half-hulled rice according to the present invention can be provided as a natural food product having high nutritive value.

There is little difference in caloric value between the half-hulled rice and milled rice. However, the half-hulled rice contains other components more than those of milled rice. Table 1 shows a comparison in components between the half-hulled rice and milled rice.

TABLE 1

| COMPARISON IN COMPONENTS BETWEEN MILLED RICE AND HALF-HULLED RICE | | | | |
|---|---|---|---|---|
| | Rice | | Boiled Rice | |
| | Half-hulled | Milled | Half-hulled | Milled |
| Energy kcal | 351 | 356 | 153.0 | 148.0 |
| Moisture g | 15.5 | 15.5 | 63.0 | 65.0 |
| Protein g | 7.4 | 6.8 | 3.3 | 2.6 |
| Lipid g | 3.0 | 1.3 | 1.3 | 0.5 |
| Saccharinity (Carbohydrate) g | 71.8 | 75.5 | 31.4 | 31.7 |
| Fiber (Carbohydrate) g | 1.0 | 0.3 | 0.4 | 0.1 |
| Ash g | 1.3 | 0.6 | 0.6 | 0.1 |
| Calcium mg | 10.0 | 6.0 | 4.0 | 2.0 |

TABLE 1-continued

COMPARISON IN COMPONENTS BETWEEN
MILLED RICE AND HALF-HULLED RICE

|  | Rice | | Boiled Rice | |
| --- | --- | --- | --- | --- |
|  | Half-hulled | Milled | Half-hulled | Milled |
| Phosphorus mg | 300.0 | 140.0 | 130.0 | 30.0 |
| Iron mg | 1.1 | 0.5 | 0.5 | 0.1 |
| Sodium mg | 2.0 | 2.0 | 2.0 | 2.0 |
| Potassium mg | 250.0 | 110.0 | 110.0 | 27.0 |
| Vitamins |  |  |  |  |
| B1 mg | 0.54 | 0.12 | 0.16 | 0.03 |
| B2 mg | 0.06 | 0.03 | 0.02 | 0.01 |
| Niacin mg | 4.5 | 1.4 | 1.6 | 0.3 |
| E | ○ |  | ○ |  |
| F | ○ |  | ○ |  |
| D | ○ |  | ○ |  |
| Inositol | ○ |  | ○ |  |
| β-cysterol | ○ |  | ○ |  |
| γ-oryzanol | ○ |  | ○ |  |
| Phytic acid | ○ |  | ○ |  |
| Octacosanol | ○ |  | ○ |  |

(Blank circle indicates that each component is contained.)

DETAILED DESCRIPTION OF PREFERRED EMBODIMENTS

Example 1

600 g of malted rice and 2300 g of boiled water cooled to 55° C. after once boiled were mixed together in a vessel, and kept warm for approximately 8 hours in a water bath controlled at a constant temperature of 57.5° C. to saccharify malted rice. Then, the mixture was boiled for 3 minutes for sterilization, and filtered through a wire mesh screen to provide filtrate. Subsequently, the filtrate and 160 g of boiled half-hulled rice were mixed together, agitated for 2 minutes and filtered through the wire mesh screen to provide filtrate free from any solid residue. A small quantity of sodium bicarbonate was added to the filtrate to provide a drink.

Example 2

450 g of half-hulled rice and water were added together, once boiled and then heated over weak frame for 30 minutes by use of a gas rice cooker to provide gruel-like boiled half-hulled rice, which was then cooled to 60° C. 67.5 g of malted rice and the gruel-like boiled half-hulled rice were added together, and kept warm for 4 hours at 60° C. A large spoonful of sodium bicarbonate and the mixture were added together, boiled for 5 minutes, agitated and filtered to provide filtrate. The filtrate was diluted doubly to provide a drink.

Example 3

300 g of malted rice and 1150 g of boiled water cooled to 55° C. after once boiled were mixed together in a vessel, kept warm at 57.5° C. for 8 hours for saccharification, then boiled for approximately 3 minutes for sterilization and filtered to provide filtrate. 80 g of boiled half-hulled rice (i.e., 30 g of half-hulled rice) and the filtrate were mixed together, agitated for 2 minutes and filtered to provide filtrate, which was consumed as a drink.

Example 4

160 g of half hulled-rice was boiled for 70 minutes according to a half-hulled rice cooking menu of a rice cooker to provide 400 g of boiled half-hulled rice, which was mixed in a vessel with 460 g of boiled water cooled to 55° C. after once boiled, and the temperature of the mixture was held at 55° C. as a whole. 60 g of malted rice and the mixture were mixed together and kept warm for approximately 7 hours in a water bath controlled at a constant temperature of 57.5° C. to saccharify the rice bran. Thereafter, 460 g of hot water and the mixture were added together and boiled for 5 minutes for sterilization. 2 g of sodium bicarbonate and the mixture were added together, agitated for 4 minutes and filtered through a wire mesh screen to provide filtrate which was consumed as a drink. Incidentally, 50 ml of plum syrup may be added to the filtrate to have an acid taste.

Example 5

160 g of half-hulled rice was boiled for 70 minutes according to a half-hulled rice cooking menu of a rice cooker to provide 400 g of boiled half-hulled rice, which was mixed in a vessel with 460 g of boiled water cooled to 55° C. after once boiled, and the temperature of the mixture was held at 55° C. as a whole. 60 g of malted rice and the mixture were mixed together and kept warm for approximately 7 hours in a water bath controlled at a constant temperature of 57.5° C. to saccharify the malted rice. Thereafter, 690 g of boiling water and the mixture were added together, and boiled for 5 minutes for sterilization. 2 g of sodium bicarbonate and the mixture were added together, agitated for 4 minutes and filtered through a wire mesh screen to provide filtrate. 125 ml of milk was then added to the filtrate.

What is claimed is:

1. A process for producing an emulsified filtrate of half-hulled rice, comprising the steps of:

mixing 2,300 g of hot water with 600 g of malted rice;

keeping the mixture at 50° to 60° C. for several hours to saccharify malted rice;

then boiling the mixture for sterilization;

filtering the mixture;

mixing the resulting filtrate with 160 g of boiled half-hulled rice;

then agitating the mixture;

filtering the mixture; and removing any residue from the mixture, thereby obtaining emulsified filtrate.

2. A process for producing an emulsified filtrate of half-hulled rice, comprising the steps of:

mixing 600 g of malted rice with 2300 g of boiled water cooled to 55° C.;

keeping the mixture at 57.5° C. for approximately 8 hours;

then boiling the mixture for sterilization;

filtering the mixture;

mixing the resulting filtrate with 160 g of boiled half-hulled rice;

agitating the mixture;

then filtering the mixture; and removing any residue from the mixture, thereby obtaining filtrate which is consumed as a drink.

3. The process for producing an emulsified filtrate of half-hulled rice according to claim 2, further comprising adjusting the taste of the filtrate by adding sodium bicarbonate thereto.

4. A process for producing an emulsified filtrate of half-hulled rice, comprising the steps of:

mixing 400 g of boiled half-hulled rice with 460 g of boiled water cooled to 55° C.;

then mixing 60 g of malted rice with the mixture;

keeping the mixture at 57.5° C. for 7 hours;

subsequently mixing 460 g of boiling water with the mixture;.

boiling the resulting mixture for 5 minutes;

agitating the mixture for 4 minutes; and then filtering the mixture, thereby obtaining filtrate.

\* \* \* \* \*